United States Patent
Yabe et al.

(10) Patent No.: US 8,525,381 B2
(45) Date of Patent: Sep. 3, 2013

(54) ROTOR OF ELECTRIC MOTOR AND ELECTRIC MOTOR AND VENTILATION FAN AND COMPRESSOR

(75) Inventors: Koji Yabe, Chiyoda-ku (JP); Hayato Yoshino, Chiyoda-ku (JP); Kazuhiko Baba, Chiyoda-ku (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 250 days.

(21) Appl. No.: 13/122,821

(22) PCT Filed: Jan. 30, 2009

(86) PCT No.: PCT/JP2009/051639
§ 371 (c)(1),
(2), (4) Date: Apr. 6, 2011

(87) PCT Pub. No.: WO2010/058609
PCT Pub. Date: May 27, 2010

(65) Prior Publication Data
US 2011/0193439 A1      Aug. 11, 2011

(30) Foreign Application Priority Data

Nov. 19, 2008  (JP) .................................. 2008-295622

(51) Int. Cl.
*H02K 21/12* (2006.01)

(52) U.S. Cl.
USPC .................................................. 310/156.53

(58) Field of Classification Search
USPC ............ 310/156.53, 156.56, 156.57, 156.83, 310/156.84, 156.45, 156.38
See application file for complete search history.

(56) References Cited

U.S. PATENT DOCUMENTS 5,581,140 A * 12/1996 Futami et al. ............ 310/156.53
5,990,591 A * 11/1999 Yamaguchi et al. ..... 310/156.53
(Continued)

FOREIGN PATENT DOCUMENTS

JP    9-093844 A    4/1997
JP    9-294344 A    11/1997
(Continued)

OTHER PUBLICATIONS

Office Action (Notification of Reasons for Rejection) dated Jul. 3, 2012, issued in corresponding Japanese Patent Application No. 2010-539164, and a partial English Translation thereof. (7 pages).

(Continued)

*Primary Examiner* — Nguyen N Hanh
(74) *Attorney, Agent, or Firm* — Buchanan Ingersoll & Rooney PC

(57) ABSTRACT

Disclosed is a rotor for an electric motor in which permanent magnets can be arranged efficiently. A rotor of the electric motor according to the present invention comprises a rotor core constructed by punching out silicon steel lamination plates into a predetermined shape and laminating a predetermined number of the silicon steel lamination plates; a plurality of cavities provided on the rotor core; flat-shaped permanent magnets having a cross-sectional face made by a long side and a short side, inserted to the cavities; a chamfered portion formed on a portion of, among intersecting points of the long side and the short side of the permanent magnets, at least the intersecting point near an outer peripheral portion of the rotor core.

10 Claims, 21 Drawing Sheets

(56) References Cited

U.S. PATENT DOCUMENTS

| | | | |
|---|---|---|---|
| 7,091,643 B2 * | 8/2006 | Burgbacher | 310/156.53 |
| 8,106,557 B2 * | 1/2012 | Yoshino et al. | 310/156.53 |
| 2004/0256940 A1 * | 12/2004 | Tsuruta et al. | 310/156.53 |
| 2007/0103024 A1 | 5/2007 | Nakayama et al. | |
| 2009/0079287 A1 * | 3/2009 | Hattori et al. | 310/156.53 |

FOREIGN PATENT DOCUMENTS

| | | |
|---|---|---|
| JP | 9-298852 A | 11/1997 |
| JP | 9-322447 A | 12/1997 |
| JP | 2000-078784 A | 3/2000 |
| JP | 2001-016809 A | 1/2001 |
| JP | 2002-345189 A | 11/2002 |
| JP | 2007-060755 A | 3/2007 |
| JP | 2007-151372 A | 6/2007 |

OTHER PUBLICATIONS

Chinese Office Action (Notification of the First Office Action) dated Dec. 5, 2012, issued in corresponding Chinese Patent Application No. 200980138633.6 and English translation. (13 pages).

International Search Report (PCT/ISA/210) for PCT/JP2009/051639 dated Apr. 14, 2009.

* cited by examiner

L 2 (CIRCUMFERENTIAL LENGTH FOR A PORTION ON CAVITY 2
WHERE THE PERMANENT MAGNET 4 IS INSERTED)

L O 2 (CIRCUMFERENTIAL LENGTH FOR A PORTION
ON CAVITY 2 WHERE THE PERMANENT MAGNET 4 IS INSERTED)

ROTOR OF ELECTRIC MOTOR AND ELECTRIC MOTOR AND VENTILATION FAN AND COMPRESSOR

TECHNICAL FIELD

The present invention relates to a rotor for interior permanent magnet motor, particularly, it relates to a shape of permanent magnet. Also, it relates to an electric motor, a ventilation fan, and a compressor that uses the rotor of this electric motor.

BACKGROUND ART

Conventionally, an interior magnet motor has been sought for in which a number of components and a magnetic leakage flux can be reduced, while torque is improved by using much number of magnets. For this purpose, an interior magnet motor is proposed (for example, patent document 1) that comprises a rotor which has a rotor core where a plurality of storage holes penetrated in a shaft direction are formed in a circumferential direction and in which magnets are disposed in the storage holes so as to provide P pieces of magnetic poles. P/2 pieces of radial storage holes which extend in a substantially radial direction and P/2 pieces of V-shaped storage holes having a substantially V shape, that project to a radial outer side, are formed alternately in the circumferential direction. The magnets are arranged in the radial storage holes. At the same time, the magnets are arranged in magnet storage parts corresponding to respective lines that form the V shapes of the V-shape storage holes. One magnetic pole is constituted of the magnet disposed in the radial storage hole and the magnet installed in the magnet storage part adjacent on either side of the circumferential direction. One different magnetic pole is constituted of the magnet arranged in the radial storage hole and the magnet installed in the magnet storage part adjacent on the other side of the circumferential direction.

Patent document 1: Japanese Published Patent Application No. 2007-151372

DISCLOSURE OF THE INVENTION

Problems to be Solved by the Invention

However, the interior magnet motor of the patent document 1, in order to increase a magnetic force from the rotor as much as possible, is configured such that the P/2 pieces of radial storage holes which extend in the substantially radial direction and the P/2 pieces of V-shaped storage holes having the substantially V shape, that project to the radial outer side, are formed alternately in the circumferential direction, thus constituting the storage holes where the magnets are disposed. The magnets are arranged in the radial storage holes. At the same time, the magnets are arranged in the magnet storage parts corresponding to the respective straight lines that form the V shapes of the V-shape storage holes. This leads to a problem of the increased number of components which deteriorates the productivity.

The present invention, in attempt to solve the above-mentioned problem, is directed to a rotor for electric motor, the electric motor, a ventilation fan, and a compressor, in which the permanent magnets can be effectively arranged.

Means to Solve the Problems

According to the present invention, a rotor for an electric motor comprises: a rotor core constructed by punching out silicon steel lamination plates into a predetermined shape and laminating a predetermined number of the silicon steel lamination plates; a plurality of cavities provided on the rotor core; flat-shaped permanent magnets having a cross-sectional face made by a long side and a short side, inserted to the cavities; and a chamfered portion formed on a portion of, among intersecting points of a long side and a short side of the permanent magnets, at least the intersecting point near an outer peripheral portion of the rotor core.

According to the present invention, in a rotor for an electric motor, one piece of permanent magnet is used for one magnet pole.

According to the present invention, a rotor for an electric motor comprises: a rotor core constructed by punching out silicon steel lamination plates into a predetermined shape and laminating a predetermined number of the silicon steel lamination plates; a plurality of V-shaped cavities provided on the rotor core; flat-shaped permanent magnets having a cross-sectional face made by a long side and a short side, inserted to the cavities; and a chamfered portion formed on a portion of, among intersecting points of a long side and a short side of the permanent magnets, at least the intersecting point near an outer peripheral portion of the rotor core.

According to the present invention, in a rotor for an electric motor, two pieces of permanent magnets are used for one magnet pole.

According to the present invention, in a rotor for an electric motor, permanent magnets are inserted to cavities, so as to form a flux barrier at an end portion of the cavities on a side of an outer peripheral portion of a rotor core of the permanent magnets.

According to the present invention, in a rotor for an electric motor, a flux barrier is formed near a chamfered portion near the outer peripheral portion of a rotor core.

According to the present invention, in a rotor for an electric motor, a thin portion having a predetermined dimension in a radial direction is formed between a rotor core and a flux barrier.

According to the present invention, in a rotor for an electric motor, a portion of a cavity other than a flux barrier, facing a chamfered portion of a permanent magnet, is made into a shape that fits to the chamfered portion, when forming the chamfered portion on each of two intersecting points of a long side and a short side of the permanent magnet near an outer peripheral portion of a rotor core.

According to the present invention, in a rotor for an electric motor, one V-shaped cavity is divided at a center portion, and a connection portion is formed between the respective cavities divided.

According to the present invention, in a rotor for an electric motor, a permanent magnet is made of a rare earth element magnet.

According to the present invention, an electric motor comprises the rotor of the electric motor described above.

According to the present invention, a ventilation fan comprises the electric motor described above.

According to the present invention, a compressor comprises the electric motor described above.

Effect of the Invention

In the rotor for the electric motor related to the present invention, a chamfered portion is formed on a portion of, among intersecting points of a long side and a short side of a permanent magnet, at least the intersecting point near an outer peripheral portion of the rotor core, so that the permanent magnet can be inserted efficiently to the rotor, making it capable to improve the magnetic force of the rotor.

DETAILED DESCRIPTION OF PREFERRED EMBODIMENTS

First Embodiment

Prior to describing the present embodiment, a rotor 100 for a commonly-used interior permanent magnet motor will be described.

FIGS. 1 to 4 illustrate the rotor 100 for the commonly-used interior permanent magnet motor. FIG. 1 illustrates a cross-sectional view of the rotor 100. FIG. 2 illustrates a partial cross-sectional view of the rotor core 1 (illustrating substantially a quarter of the rotor core 1). FIG. 3 illustrates a partial cross-sectional view of the rotor 100. FIG. 4 illustrates a partial cross-sectional view of the rotor 100 having a permanent magnet 4 with a maximum circumferential length.

The rotor 100 of the commonly-used interior permanent magnet motor shown in FIG. 1 has 4 magnetic poles. The rotor 100 comprises a cylindrical rotor core 1 having a shaft hole 5 at the center, flat-shaped permanent magnets 4, and edge plates (not illustrated) that act as a stopper of the permanent magnets 4. The edge plates are disposed at both ends of the rotor core 1 in the shaft direction, and fixed altogether after having inserted the permanent magnets 4, by using, for example, rivets or the like.

The cylindrical rotor core 1 is formed by punching thin silicon steel lamination plates having a thickness of about 0.2 mm to 0.5 mm, into a prescribed shape, one by one, and laminating a prescribed number of such plates in layer.

The cylindrical rotor core 1 comprises the following elements.

(1) Four cavities 2 having a substantially rectangular shape in cross section, that are arranged at a substantially equal interval along an outer peripheral edge in the circumferential direction of the rotor core 1.
(2) A circular shaft hole 5 provided at the center of the rotor core 1.
(3) Rivet holes, air holes, and the like (not illustrated).

Regarding the cavity 2, as illustrated in FIG. 2 also, its both circumferential end portions have a shape of enlarged corners on an outer perimeter side at both end portions, so as to form flux barriers 2b when the permanent magnet 4 is inserted to each of the cavities 2. The flux barriers 2b are necessary to control a leakage of magnetic flux at circumferential end portions of the permanent magnet 4 itself.

In other words, thin portions 3 each having a substantially constant radial direction dimension over a predetermined length are formed between the outer peripheral edge of the rotor core 1 and respective end portions 2a, that is, the enlarged corners on the outer perimeter side at both circumferential end portions of the cavity 2 (also refer to FIG. 2).

As shown in FIG. 1, L1 denotes a circumferential length of the permanent magnet 4. A magnetization direction of the permanent magnet 4 is a radial direction perpendicular to the circumferential direction of the permanent magnet 4.

As shown in FIG. 2, the cavities 2 are formed along the outer peripheral edge of the rotor core 1 in the circumferential direction. L2 denotes a circumferential length of a portion of the cavity 2 for inserting the permanent magnet 4.

The circumferential length L2 of the portion of the cavity 2 for inserting the permanent magnet 4 is slightly longer than the circumferential length L1 of the permanent magnet 4, in order to insert the permanent magnet 4 to the cavity 2.

FIG. 3 is a partial enlarged drawing showing a state of having inserted the permanent magnet 4 to the cavity 2. As shown in FIG. 3, there are flux barriers 2b present between the corners on the outer perimeter side of the circumferential end portions of the permanent magnet 4 and the end portions 2a which are enlarged corner portions at both circumferential end portions of the cavity 2.

In order to improve an efficiency or a maximum torque of the interior permanent magnet motor, it is effective to increase the magnetic force of the permanent magnet 4.

As one of the methods available for increasing the magnetic force of the permanent magnet 4, there is a method for lengthening the circumferential length L1 of the permanent magnet 4.

As shown in FIG. 3, there is still a space available, i.e., the flux barrier 2b, between the corners on the outer perimeter side of the circumferential end portions of the permanent magnet 4 and the end portions 2a which are enlarged portions of the corners at both ends of the cavity 2 in the circumferential direction. Therefore, the circumferential length L1 of the permanent magnet 4 can be made longer by lengthening the circumferential length L2 of the portion of the cavity 2 for inserting the permanent magnet 4 (refer to FIG. 2).

However, in case of lengthening the circumferential length L1 of the permanent magnet 4, the end portions 2a which are enlarged portions of the corners at both ends of the cavity 2 in the circumferential direction cannot be moved. Therefore, a length limit is the end portions of the permanent magnet 4 in the circumferential direction touching the end portions 2a of the cavity 2 (L1max of FIG. 4).

In order to improve the magnetic force beyond the permanent magnet 4 having a maximum dimension L1max, a method for dividing the permanent magnet 4, such as V-shaped arrangement, is being adopted. However, this deteriorates the productivity due to an increased number of components.

In order to increase the magnetic force without deteriorating the productivity, the permanent magnet 4 may be shaped by increasing its circumferential length as much as possible.

The present embodiment describes a method for lengthening the circumferential length L1 of the permanent magnet 4 beyond the limit within the rotor 100 for the commonly-used interior permanent magnet motor mentioned above.

FIGS. 5 to 11 illustrate the first embodiment. FIG. 5 illustrates a cross-sectional view of a rotor 100 of the interior permanent magnet motor. FIG. 6 illustrates a partial cross-sectional view of a rotor core 1. FIG. 7 illustrates a partial cross-sectional view of the rotor 100. FIG. 8 illustrates an enlarged view of part A of FIG. 7. FIG. 9 illustrates a cross-sectional view of the rotor 100 of the modified example 1. FIG. 10 illustrates a partial cross-sectional view of the rotor 100 of the modified example 1. FIG. 11 illustrates a partial cross-sectional view of the rotor 100 of the modified example 2.

A shape of the permanent magnet 4 of the rotor 100 for the interior permanent magnet motor of the present embodiment shown in FIGS. 5, 7 and 8 is different from the shape of the permanent magnet 4 of the rotor 100 for the commonly-used interior permanent magnet motor shown in FIG. 1.

The differences between the permanent magnet 4 of the present embodiment and the permanent magnet 4 of the rotor 100 of the commonly-used interior permanent magnet motor are as stated below.

(1) A circumferential length L01 of the permanent magnet 4 is longer than the maximum circumferential length L1max of the permanent magnet 4 of the rotor 100 for the commonly-used interior permanent magnet motor (refer to FIG. 4).

(2) L01>L1max is achievable because chamfered portions 4a are provided by chamfering the corners on the outer perimeter side of the circumferential end portions of the permanent magnet 4. In FIG. 5, the reference numeral of the chamfered portions 4a is denoted to one of the chamfered portions 4a only, and is omitted for the others.

In order that the permanent magnet 4 having the circumferential length L01 can be inserted to the cavity 2, as shown in FIG. 6, a circumferential length L02 of a portion for inserting the permanent magnet 4 to the cavity 2 also is made longer than L2 of the commonly-used rotor core 1 shown in FIG. 2.

The circumferential length L01 of the permanent magnet 4 is longer than the maximum circumferential length L1max of the permanent magnet 4 of the rotor 100 of the commonly-used interior permanent magnet motor (refer to FIG. 4). FIG. 8 is referred to to describe the extent of lengthening.

As shown in FIG. 8, the circumferential length of the permanent magnet 4 becomes longer than the circumferential length L1max of the permanent magnet 4 of FIG. 4 where the end portions of the permanent magnet 4 in the circumferential direction touch the end portions 2a of the cavity 2, by chamfering the corners on the outer perimeter side of the circumferential end portions of the permanent magnet 4, by ΔL per side. At both sides, it becomes large by 2ΔL, so that a relationship between L01 and L1max can be expressed as the equation (1) shown below.

$$L01 = L1\text{max} + 2\Delta L \tag{1}$$

Accordingly, the chamfered portion 4a is provided by chamfering the corner on the outer perimeter side of the circumferential end portion of the permanent magnet 4, so that the circumferential length of the permanent magnet 4 can be made greater than that of a commonly-used shape of the permanent magnet 4. As a result of this, the magnetic force of the permanent magnet 4 improves, allowing for a highly efficient interior permanent magnet motor.

In the drawings (for example, FIG. 7), the permanent magnet 4 seems to be placed in the cavity 2 without any gap in the circumferential direction and the radial direction. However, in practice, between the cavity 2 and the permanent magnet 4, there is a gap of a predetermined dimension in the circumferential direction and the radial direction to allow insertion of the permanent magnet 4 in the cavity 2. As a result, the permanent magnet 4 may move by that amount of the gap within the cavity 2.

Thus, preferably, the chamfered portion 4a of the permanent magnet 4 is chamfered such that it does not come into contact with a thin portion 3 (the end portion 2a of the cavity 2) within the cavity 2, regardless of the position of the permanent magnet 4 inside the cavity 2 within an area of the gap between the cavity 2 and the permanent magnet 4.

When the rotor 100 rotates, the permanent magnet 4 will move within the cavity 2, so that there is a danger that the thin portion 3 might break upon touching the permanent magnet 4. However, by forming the chamfered portion 4a of the permanent magnet 4 such that it does not touch the thin portion 3, a risk of the thin portion 3 breaking due to the permanent magnet 4 touching the thin portion 3 can be reduced.

The shape of the chamfered portion 4a of the permanent magnet 4 can be of any shape, such as linear or circular arc.

When lengthening the circumferential length of the permanent magnet 4, the permanent magnet 4, if not chamfered, touches the thin portion 3 of the rotor core 1. The characteristic of the present embodiment resides not only in chamfering the permanent magnet 4, but also in forming the shape of the permanent magnet 4 insertable to the cavity 2 by chamfering the contact portion where the permanent magnet 4 touches the thin portion 3 of the rotor core 1.

To put it in other words, assume that an intersecting point B where extended lines of the long side 4b and short side 4c of the permanent magnet 4 shown in FIG. 8 meet, is not positioned within a flux barrier 2b at the end portion of the permanent magnet 4, but is positioned on the thin portion 3 of the rotor core 1 or the outer side of the thin portion 3 in the radial direction. Then, the chamfered portion 4a is provided by chamfering the corner of the permanent magnet 4 on the outer perimeter side corresponding to that portion, thereby resulting in a shape that does not allow the permanent magnet 4 to touch the thin portion 3 of the rotor core 1.

Also, demagnetization of the permanent magnet 4 occurs from the circumferential end portion of the permanent magnet 4. The demagnetized portion will be reduced by providing the chamfered portion 4a by chamfering the corner on the outer perimeter side of the permanent magnet 4, thereby improving a resistance to demagnetization of the permanent magnet 4.

FIG. 9 illustrates a cross sectional view of the rotor 100 of the modified example 1. FIG. 10 illustrates a partial cross sectional view of the rotor 100 of the modified example 1. As shown in FIGS. 9 and 10, the four corners of the permanent magnet 4 are chamfered into substantially the same shape, thereby providing the chamfered portions 4a at the four corners.

For the permanent magnet 4 shown in FIGS. 5 and 7, the shape of the cross sectional face shows even left-right symmetry, but shows uneven up-down symmetry. When the direction of inserting the permanent magnet 4 is mistaken during the production stage, the productivity deteriorates because it cannot be inserted to the cavity 2.

For the permanent magnet 4 shown in FIGS. 9 and 10, the shape of the cross sectional face shows even left-right and up-down symmetries. Accordingly, the productivity improves since there is no limit in the direction of inserting the permanent magnet 4.

Although omitted in the drawing, in detail, the shape of the cavity 2 has a slight dent that corresponds to the corner of the permanent magnet 4, so that the corners of the permanent magnet 4 do not touch the cavity 2. By chamfering all corners of the permanent magnet 4, the dents (the escape portions) that correspond to the corners of the permanent magnet 4 are not needed on the cavity 2. From this, a mold casting shape can be simplified to reduce the expense of the mold casting.

FIG. 11 illustrates a partial cross sectional view of the rotor 100 of the modified example 2. As shown in FIG. 11, a portion at an inner side of the cavity 2 corresponding to the chamfered portion 4a of the permanent magnet 4 is matched to the shape of the chamfered portion 4a of the permanent magnet 4, thereby forming a chamfered portion 2c.

In the rotor 100 of the modified example 1 shown in FIGS. 9 and 10, the four corners of the permanent magnet 4 are chamfered substantially into the same shape, thus providing the chamfered portions 4a on the four corners, such that flux barriers 2d are present between the cavity 2 and the permanent magnet 4.

A portion in the cavity 2 corresponding to the chamfered portion 4a at the inner side of the permanent magnet 4 is shaped to match the chamfered portion 4a of the permanent magnet 4, thereby forming a chamfered portion 2c. In this way, the flux barrier 2d is reduced, thereby improving the permeance of the magnetic path of the permanent magnet 4 (a reciprocal of the magnetic resistance), the magnetic force of the permanent magnet 4, and the resistance to demagnetization.

Preferably, the shapes of the chamfered portions 2c of the cavity 2 match the shapes of the chamfered portions 4a of the corners of the permanent magnet 4. However, as long as it can reduce the flux barrier 2d formed by providing the chamfered portions 4a at the four corners by chamfering the four corners of the permanent magnet 4 substantially into the same shape, a rounded shape, besides a linear shape, can also be adopted to produce the similar effect.

Normally, the permanent magnet 4 is slightly chamfered in some cases. However, the present embodiment is characterized in chamfering the permanent magnet 4 which, if not chamfered, may come into contact with the thin portion 3 of the rotor core 1, so the permanent magnet 4 and the thin portion 3 of the rotor core 1 do not come into contact.

The present embodiment is different from a case in which the permanent magnet 4 is chamfered although it, even if not chamfered, does not come into contact with the thin portion 3 of the rotor core 1.

Both circumferential end portions of the cavity 2 have a shape of enlarged corners on the outer perimeter side at both end portions, so as to form a flux barrier 2b upon inserting the permanent magnet 4 to the cavity 2. The shape of the flux barrier 2b is not limited to the shape shown in FIGS. 5 to 11, and any shape may be applied.

Regardless of the shape of the flux barrier 2b, when the non-chamfered permanent magnet 4 comes into contact with the thin portion 3 of the rotor core 1, the effect is produced as long as the chamfered portion 4a does not allow the corner of the permanent magnet 4 to touch the thin portion 3 of the rotor core 1.

Also, the shape of the chamfered portion 4a of the permanent magnet 4 doesn't have to be linear, and it can be rounded (circular arc) or the like. In other words, the effect is produced by forming the corner of the permanent magnet 4 not to come into contact with the thin portion 3 of the rotor core 1.

Second Embodiment

FIGS. 12 to 21 show the second embodiments. FIG. 12 shows a partial cross-sectional view of the rotor core 1. FIG. 13 shows a partial cross-sectional view of a rotor 100. FIG. 14 shows an enlarged view of part D of FIG. 13. FIG. 15 shows a partial cross-sectional view of the rotor 100 of the modified example 1. FIG. 16 shows an enlarged view of part E of FIG. 15. FIG. 17 shows a partial cross-sectional view of the rotor 100 of the modified example 2. FIG. 18 shows a partial cross-sectional view of the rotor 100 of the modified example 3. FIG. 19 shows a partial cross-sectional view of the rotor core 1 of the modified example 4. FIG. 20 shows a partial cross-sectional view of the rotor 100 of the modified example 4. FIG. 21 shows an enlarged view of part H of FIG. 20.

Hereinbelow, the second embodiment will be described with reference to the drawings, however, the description for the portions that overlap with the first embodiment is omitted.

As shown in FIG. 12, the rotor core 1 of the present embodiment provides V-shaped cavities 2. Each of the V-shaped cavities 2 is arranged in an almost V-like protrusion in the rotor core 1 (a shaft hole 5 side). The cavity 2 is V-shaped, which is the only difference from the rotor core 1 of the first embodiment shown in FIG. 6. Except for this, the rotor core 1 of the second embodiment is identical to that of the first embodiment.

FIG. 13 shows one magnetic pole of the rotor 100. Two permanent magnets 4 are inserted to the V-shaped cavity 2. As shown in the same drawing, the two permanent magnets 4 are magnetized such that one magnetic pole is constructed from the two permanent magnets 4.

A shape of the two permanent magnets 4 as a whole is symmetrical with respect to a magnetic pole center. The corners on the magnetic pole center side end portions of the two permanent magnets 4 are not chamfered. The corners on the outer perimeter side of the flux barrier 2b side end portions of the two permanent magnets 4 are chamfered, thereby forming the chamfered portions 4a.

When the corners on the outer perimeter side of the flux barrier 2b side end portions of the two permanent magnets 4 are not chamfered, as shown in FIG. 14, each permanent magnet 4 is of such a size that the intersecting point D of its long side 4b and short side 4c is not positioned within the flux barrier 2b at the end portion of the permanent magnet 4, but is positioned on a thin portion 3 of the rotor core 1 or positioned on the outer side of the thin portion 3 in the radial direction.

By chamfering the corners on the outer perimeter side of the end portions of the flux barrier 2b side of the permanent magnets 4 having such a shape, the chamfered portion 4a is positioned within the flux barrier 2b, and the two permanent magnets 4, when inserted to the V-shaped cavity 2, do not come in contact with the thin portions 3.

The respective corners of the two permanent magnets 4 on the outer perimeter side of the magnetic pole center side end portions are touching substantially at the magnetic pole center. The respective corners of the two permanent magnets 4 on the counter outer perimeter side (the shaft hole 5 side) of the end portions on the magnetic pole center side are not touching.

By positioning the two permanent magnets 4 in V-shape into a V-shaped cavity 2 of the rotor core 1, the permanent magnets 4 as a whole that constitute one magnetic pole become large, so that the magnetic force of the rotor 100 improves, compared to the case when one permanent magnet 4 is placed to form one magnetic pole of the rotor core 1 (for instance, FIGS. 5 and 7).

As shown in the first embodiment, in order to improve the magnetic force of the rotor 100, the circumferential length of the permanent magnet 4 (the long side 4b) must be increased.

When each permanent magnet 4 is of such a size that the intersecting point D of its long side 4b and short side 4c (FIG. 14) is not positioned within the flux barrier 2b at the end portion of the permanent magnet 4 but is positioned on the thin portion 3 of the rotor core 1 or on the outer side of the thin portion 3 in the radial direction, the two permanent magnets 4 cannot be inserted to the V-shaped cavity 2.

The chamfered portions 4a are positioned within the flux barrier 2b by chamfering the corners on the outer perimeter side of the flux barrier 2b side end portion of the two permanent magnets 4. Then, the two permanent magnets 4, when inserted to the V-shaped cavity 2, do not come in contact with the thin portions 3. In this way, a width of the permanent magnets 4 as a whole is increased more than the conventional type in which merely the two permanent magnets 4 are placed in V-shape, thereby improving the magnetic force of the rotor 100. As a result of this, a highly efficient interior permanent magnet motor is possible.

The permanent magnet 4 of FIG. 13 seems to be inserted in the cavity 2 without any gap in the circumferential direction and the radial direction. In practice, however, between the cavity 2 and the permanent magnet 4, there is a gap having a prescribed dimension in the circumferential direction and the radial direction for making the permanent magnet 4 insertable to the cavity 2. For this reason, the permanent magnet 4 is movable by the amount of gap within the cavity 2.

Thus, preferably, the chamfered portion 4a of the permanent magnet 4 is chamfered such that it does not come into contact with the thin portion 3 (the end portion 2a of the cavity 2) within the cavity 2, regardless of the position of the permanent magnet 4 inside the cavity 2 within an area of the gap between the cavity 2 and the permanent magnet 4.

When the rotor 100 rotates, the permanent magnet 4 will move within the cavity 2, and there is a danger that the thin portion 3 might break upon touching the permanent magnet 4. By forming the chamfered portion 4a of the permanent magnet 4 such that it does not touch the thin portion 3, a risk of the thin portion 3 breaking due to the permanent magnet 4 touching the thin portion 3 can be reduced.

In case of lengthening the circumferential length (the long side 4b) of the permanent magnet 4, the permanent magnet 4, if not chamfered, touches the thin portion 3 of the rotor core 1. The characteristic of the present embodiment resides not only in chamfering the permanent magnet 4, but also in forming the shape of the permanent magnet 4 insertable to the cavity 2 by chamfering the contact portion where the permanent magnet 4 touches the thin portion 3 of the rotor core 1.

To put it in other words, assume that the intersecting point D where extended lines of the long side 4b and short side 4c of the permanent magnet 4 shown in FIG. 14 meet, is not positioned within the flux barrier 2b at the end portion of the permanent magnet 4, but is positioned on the thin portion 3 of the rotor core 1 or the outer side of the thin portion 3 in the radial direction. Then, the chamfered portion 4a is provided by chamfering the corner of the permanent magnet 4 on the outer perimeter side corresponding to that portion, thereby resulting in a shape that does not allow the permanent magnet 4 to touch the thin portion 3 of the rotor core 1.

Also, demagnetization of the permanent magnet 4 occurs from the circumferential end portion of the permanent magnet 4. The demagnetized portion will be reduced by providing the chamfered portion 4a by chamfering the corner on the outer perimeter side of the permanent magnet 4, thereby improving a resistance to demagnetization of the permanent magnet 4.

In the rotor 100 of the modified example 1 shown in FIG. 15, the chamfered portions 4a are formed by chamfering the corners on the outer perimeter side of the respective magnetic pole center side end portions of the two permanent magnets 4.

Accordingly, the two permanent magnets 4 form the chamfering portions 4a by chamfering the corners on the outer perimeter side of the magnetic pole center side end portions, and the corners on the outer perimeter side of the flux barrier 2b side end portion, respectively.

According to the rotor 100 shown in FIG. 13, the two permanent magnets 4 are touching at their corners on the outer perimeter side of the respective magnetic pole center side end portions, at the substantially magnetic pole center. The circumferential length of the permanent magnet 4 (the long side 4b) cannot be lengthened as it is.

However, as shown in FIG. 15, the chamfering portions 4a are formed by chamfering the corners on the outer perimeter side of the respective magnetic pole center side end portions of the two permanent magnets 4, thereby lengthening the circumferential length of the permanent magnet 4 (the long side 4b).

FIG. 16 illustrates the extent of lengthening of the circumferential length of the permanent magnet 4 (the long side 4b) by forming the chamfering portions 4a by chamfering the corners on the outer perimeter side of the magnetic pole center side end portions of the two permanent magnets 4.

A part indicated by a broken line on FIG. 16 illustrates the respective magnetic pole center side end portions of the two permanent magnets 4 before forming the chamfering portions 4a by chamfering the corners on the outer perimeter side of the respective magnetic pole center side end portions of the two permanent magnets 4. In this case, the two permanent magnets 4 meet at a point F.

The point where the two permanent magnets 4 meet is shifted to a point G in case of forming the chamfering portions 4a by chamfering the corners on the outer perimeter side of the respective magnetic pole center side end portions of the two permanent magnets 4.

Then, the respective two permanent magnets 4 form the chamfering portions 4a by chamfering the corners on the outer perimeter side of the respective magnetic pole center side end portions, so that the circumferential length (the long side 4b) of each permanent magnet 4 is shortened by $\Delta L1$, compared to the case of not forming the chamfering portion 4a.

Also, the permanent magnet 4 can be inserted by reversing the shaft direction when the chamfering portions 4a are formed by chamfering the corners on the outer perimeter side of the respective magnetic pole center side end portions of the two permanent magnets 4. The operation of inserting the permanent magnet 4 into the cavity 2 becomes easy, thereby improving the productivity.

The rotor 100 of the modified example 2 shown in FIG. 17 forms the chamfering portions 4a having substantially the same shape by chamfering all four corners of the permanent magnets 4. In this way, the permanent magnet 4 can be inserted to the cavity 2 without worrying about the direction of the permanent magnet 4, thereby improving the productivity.

Although not illustrated in the drawing, in detail, the shape of the cavity 2 has a slight dent that corresponds to the corners of the permanent magnet 4, so that the corners of the permanent magnets 4 do not touch the cavity 2. By chamfering all corners of the permanent magnet 4, the dents (the escape portions) that correspond to the corners of the permanent magnet 4 are not needed on the cavity 2. From this, a mold casting shape can be simplified to reduce the expense of the mold casting.

In the rotor 100 of the modified example 1 shown in FIG. 17, four corners of the permanent magnet 4 are chamfered substantially into the same shape, so that the chamfering portions 4a are provided on the four corners. Therefore, there exist the flux barriers 2d between the cavity 2 and the permanent magnets 4, on the thin portion 3 side end portion of the cavities 2.

As shown in FIG. 18, on the thin portion 3 side end portion of the cavities 2, a portion of the flux barrier 2d in the cavity 2 corresponding to the chamfered portion 4a at the inner side of the permanent magnet 4 is shaped to match the chamfered portion 4a of the permanent magnet 4, thereby forming the chamfered portion 2c. In this way, the flux barrier 2d is reduced, thereby improving the permeance of the magnetic path of the permanent magnet 4 (a reciprocal of the magnetic resistance), the magnetic force of the permanent magnet 4, and the resistance to demagnetization.

According to the rotor core 1 shown in FIG. 19, the V-shaped cavity 2 is divided into two. There exists a connection portion 6 in between the two cavities 2.

Magnetic pole center side end portions 2e of the two cavities 2 are facing one another parallel to each other sandwiching the connection portion 6. Then, each chamfering portion 2c stretches to the inner side of the magnetic pole center side end portion 2e.

In each of the two cavities 2, the chamfering portion 2c stretches to the inner side of the thin portion 3 side end portion 2a.

As shown in FIG. 20, the two permanent magnets 4 having the chamfering portions 4a formed by chamfering the four corners are inserted to the two cavities 2.

The connection portion 6 is provided for a purpose of preventing the breakage of the permanent magnets 4 by coming into contact with one another when they move during the operation, and improving the strength of the rotor 100 against the centrifugal force and the electromagnetic force.

As shown in FIG. 20, even if the connection portion 6 exists in between the two cavities 2, the circumferential length (the long side 4b) of the permanent magnets 4 as a whole can be increased by chamfering the permanent magnets 4. Since the magnetic force has improved, an improvement in the efficiency of the interior permanent magnet motor is achievable.

FIG. 21 is an enlarged view of part H of FIG. 20, however, for simplicity, the chamfering portion 2c that stretches to the magnetic pole center side end portion 2e of each of the two cavities 2 facing in parallel sandwiching the connection portion 6 is omitted.

The chamfering portion 4a of the connection portion 6 side end portion of the permanent magnet 4 is only provided on the outer perimeter side. This is because the chamfering portion 4a on the outer perimeter side of the connection portion 6 side end portion of the permanent magnet 4 only is related to increasing of the circumferential length (the long side 4b) of the permanent magnet 4, upon providing the connection portion 6 in between the two cavities 2.

As shown in FIG. 21, when the connection portion 6 side end portion of the permanent magnet 4 is not chamfered, a position of the connection portion 6 side end portion of the permanent magnet 4 lies on the broken line. In contrast to this, when the chamfering portion 4a is formed on the outer perimeter side of the connection portion 6 side end portion of the permanent magnet 4, the circumferential length (the long side 4b) of the permanent magnet 4 is increased by ΔL2.

Preferably, the shapes of the chamfered portions 2c of the cavity 2 shown in FIG. 20 match the shapes of the chamfered portions 4a of the corners of the permanent magnet 4. However, as long as it can reduce the flux barrier 2d formed by providing the chamfered portions 4a at the four corners by chamfering the four corners of the permanent magnet 4 substantially into the same shape, a rounded shape, besides a linear shape, can also be adopted to produce the similar effect.

Normally, the permanent magnet 4 is slightly chamfered in some cases. However, the present embodiment is characterized in chamfering the permanent magnet 4 which, if not chamfered, may come into contact with the thin portion 3 of the rotor core 1, so the permanent magnet 4 and the thin portion 3 of the rotor 1 do not come into contact.

Both circumferential end portions of the cavity 2 have a shape of enlarged corners on the outer perimeter side at both the end portions, so as to form the flux barrier 2b upon inserting the permanent magnet 4 to the cavity 2. The shape of the flux barrier 2b is not limited to the shape shown in FIG. 13, and any shape may be applied.

Regardless of the shape of the flux barrier 2b, when the non-chamfered permanent magnet 4 comes into contact with the thin portion 3 of the rotor core 1, the effect is produced as long as the chamfered portion 4a does not allow the corner of the permanent magnet 4 to touch the thin portion 3 of the rotor core 1.

Also, the shape of the chamfered portion 4a of the permanent magnet 4 doesn't have to be linear, and it can be rounded or the like. The effect is produced by forming the corner of the permanent magnet 4 not to come into contact with the thin portion 3 of the rotor core 1.

As described above, by positioning the two permanent magnets 4 in V-shape into the V-shaped cavity 2 of the rotor core 1, permanent magnets 4 as a whole that constitute one magnetic pole become larger than the case of arranging a single permanent magnet 4 to form one magnetic pole of the rotor core 1, thereby improving the magnetic force of the rotor 100.

The chamfered portions 4a are positioned within the flux barrier 2b by chamfering the corners on the outer perimeter side of the flux barrier 2b side end portion of the two permanent magnets 4. Then, the two permanent magnets 4, when inserted to the V-shaped cavities 2, do not come in contact with the thin portions 3. In this way, a width of the permanent magnets 4 as a whole is increased more than the conventional type in which merely the two permanent magnets 4 are placed in V-shape, thereby improving the magnetic force of the rotor 100. As a result of this, a highly efficient interior permanent magnet motor is possible.

When the rotor 100 rotates, the permanent magnet 4 will move within the cavity 2, and there is a danger that the thin portion 3 might break upon touching the permanent magnet 4. By forming the chamfered portion 4a of the permanent magnet 4 such that it does not touch the thin portion 3, a risk of the thin portion 3 breaking due to the permanent magnet 4 touching the thin portion 3 can be reduced.

Also, demagnetization of the permanent magnet 4 occurs from the circumferential end portion of the permanent magnet 4. The demagnetized portion will be reduced by providing the chamfered portion 4a by chamfering the corner on the outer perimeter side of the permanent magnet 4, thereby improving the resistance to demagnetization of the permanent magnet 4.

Also, the permanent magnet 4 can be inserted by reversing the shaft direction when the chamfering portions 4a are formed by chamfering the corners on the outer perimeter side of the respective magnetic pole center side end portions of the two permanent magnets 4. The operation of inserting the permanent magnet 4 into the cavity 2 becomes easy, thereby improving the productivity.

Also, the chamfering portions 4a are formed by chamfering all four corners of the permanent magnet 4 substantially into the same shape. In this way, the permanent magnet 4 can be inserted to the cavity 2 without worrying about the direction of the permanent magnet 4, thereby improving the productivity.

In detail, the shape of the cavity 2 has a slight dent that corresponds to the corner of the permanent magnet 4, so that the corners of the permanent magnet 4 do not abut the cavity 2. By chamfering all corners of the permanent magnet 4, the dents (the escape portions) that correspond to the corners of the permanent magnet 4 are not needed on the cavity 2. From this, a mold casting shape can be simplified to reduce the expense of the mold casting.

On the thin portion 3 side end portion of the cavities 2, a portion of the flux barrier 2d in the cavity 2 corresponding to the chamfered portion 4a at the inner side of the permanent magnet 4 is shaped to match the chamfered portion 4a of the permanent magnet 4, thereby forming the chamfered portion 2c. In this way, the flux barrier 2d is reduced, thereby improving the permeance of the magnetic path of the permanent magnet 4 (a reciprocal of the magnetic resistance), the magnetic force of the permanent magnet 4, and the resistance to demagnetization.

The connection portion 6, provided in between the two cavities 2, divides the V-shaped cavity 2 into two, for a purpose of preventing the breakage of the permanent magnets 4 by coming into contact with one another when they move during the operation, and improving the strength of the rotor 100 against the centrifugal force or the electromagnetic force.

As shown in FIG. 20, even if the connection portion 6 exists in between the two cavities 2, the circumferential length (the long side 4b) of the permanent magnet 4 can be increased by chamfering the permanent magnet 4. Since the magnetic force has improved, a high efficiency of the interior permanent magnet motor is achieved.

Third Embodiment

A highly-efficient and low-cost electric motor can be acquired by using the rotor 100 in accordance with the first or second embodiment for the electric motor (for example, the interior permanent magnet motor).

Also, upon using a sintered rare earth element magnet as the permanent magnet 4, a rectangular shape is frequently used being low in production cost. For this reason, although the degree of freedom in the shape of the permanent magnet 4 is low for the shapes described in the first or second embodiment, however, an increase in the processing expense is less because only the chamfered portions 4a of the permanent magnet 4 are added.

Alternatively, even if the shape of the permanent magnet 4 is the rectangular shape as usual, there are cases where the increase in the processing expense involved in providing the chamfering portion 4a is less because the corners may be chamfered slightly. For this reason, even if the chamfered portion 4a is formed on the permanent magnet 4, the increase in the processing expense is less, making it capable of producing without the increase in the production cost.

For this reason, even if the sintered rare earth element magnet is used to form the rectangular shaped permanent magnet 4, by employing the shape described in the first or second embodiment, the production cost is suppressed as much as possible, and the size of the permanent magnet 4 can be enlarged. The rotor 100 which is low in cost and having a high magnetic force is configured accordingly.

Also, the electric motor that uses the rotor 100 described in the first or second embodiment (for example, the interior permanent magnet motor), since the magnetic force of the rotor 100 improves, can operate at a high-efficiency, and the loss is less. The heat generated from the electric motor is decreased by reducing the loss, the change over time is minimized, and a long lasting electric motor is obtained.

Also, if the electric motor that uses the rotor 100 shown in the first or second embodiment (for example, the interior permanent magnet motor) is loaded to the compressor of the refrigerating cycle and to the ventilation fan of the air conditioner, a highly efficient, low in cost, and long lasting compressor and ventilation fan can be obtained.

EXPLANATION OF SIGNS

Figure 1:
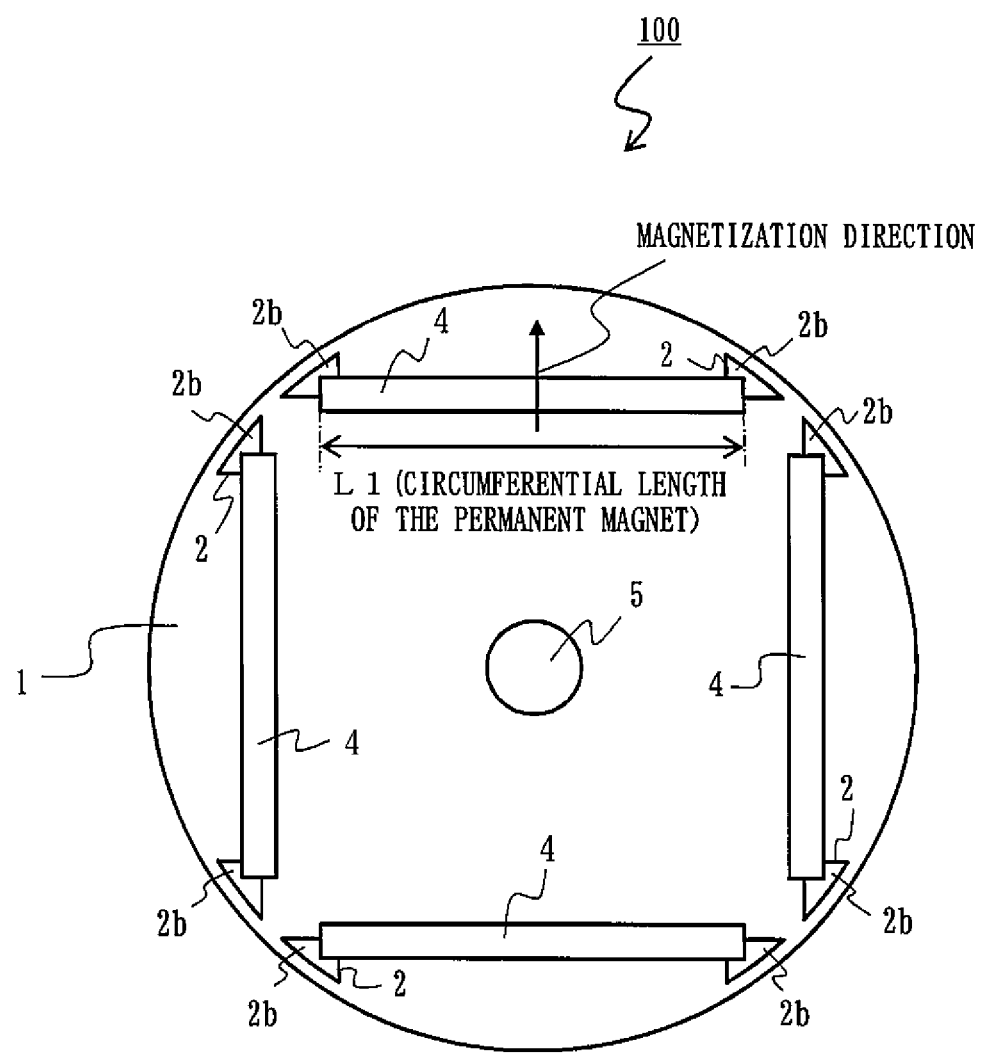
FIG. 1 A cross-sectional view of the rotor 100 for the commonly-used interior permanent magnet motor.
Figure 2:
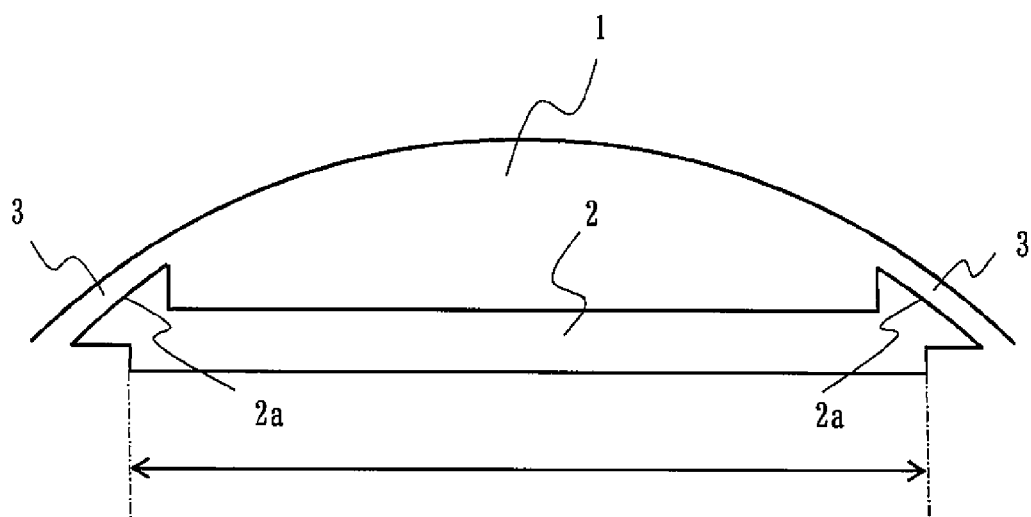
FIG. 2 A partial cross-sectional view of the rotor core 1 (illustrating substantially a quarter of the rotor core 1) for the commonly-used interior permanent magnet motor.
Figure 3:
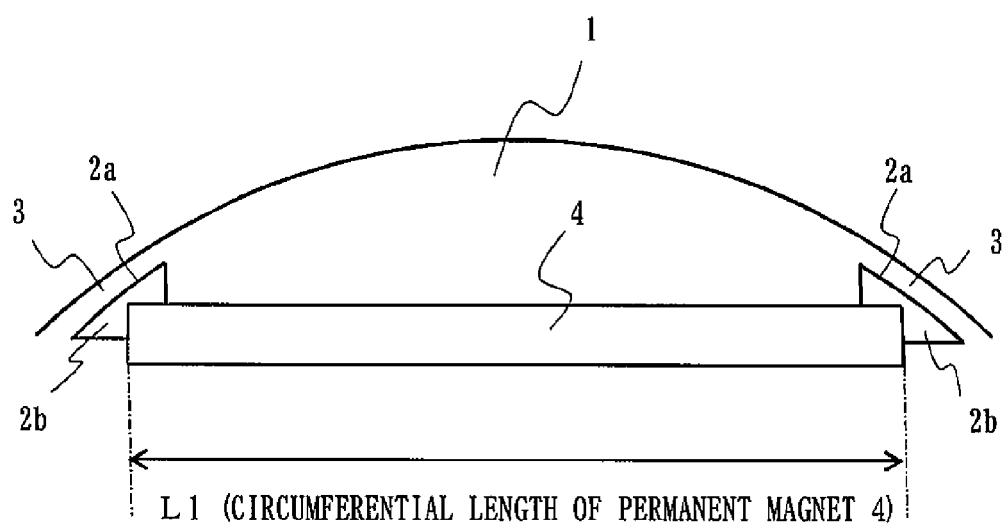
FIG. 3 A partial cross-sectional view of the rotor 100 for the commonly-used interior permanent magnet motor.
Figure 4:
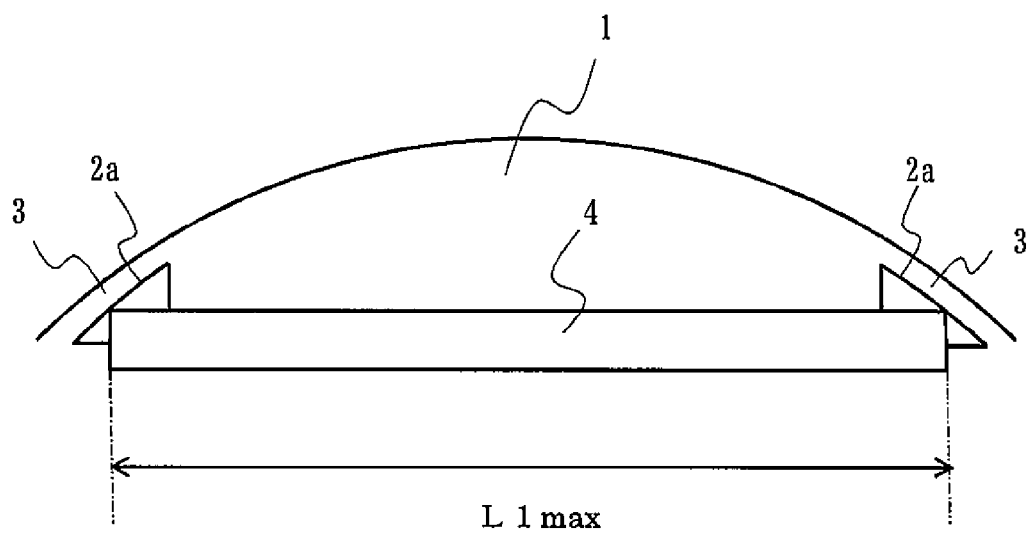
FIG. 4 A partial cross-sectional view of the rotor 100 for the commonly-used interior permanent magnet motor and having a permanent magnet 4 with a maximum circumferential direction length.
Figure 5:
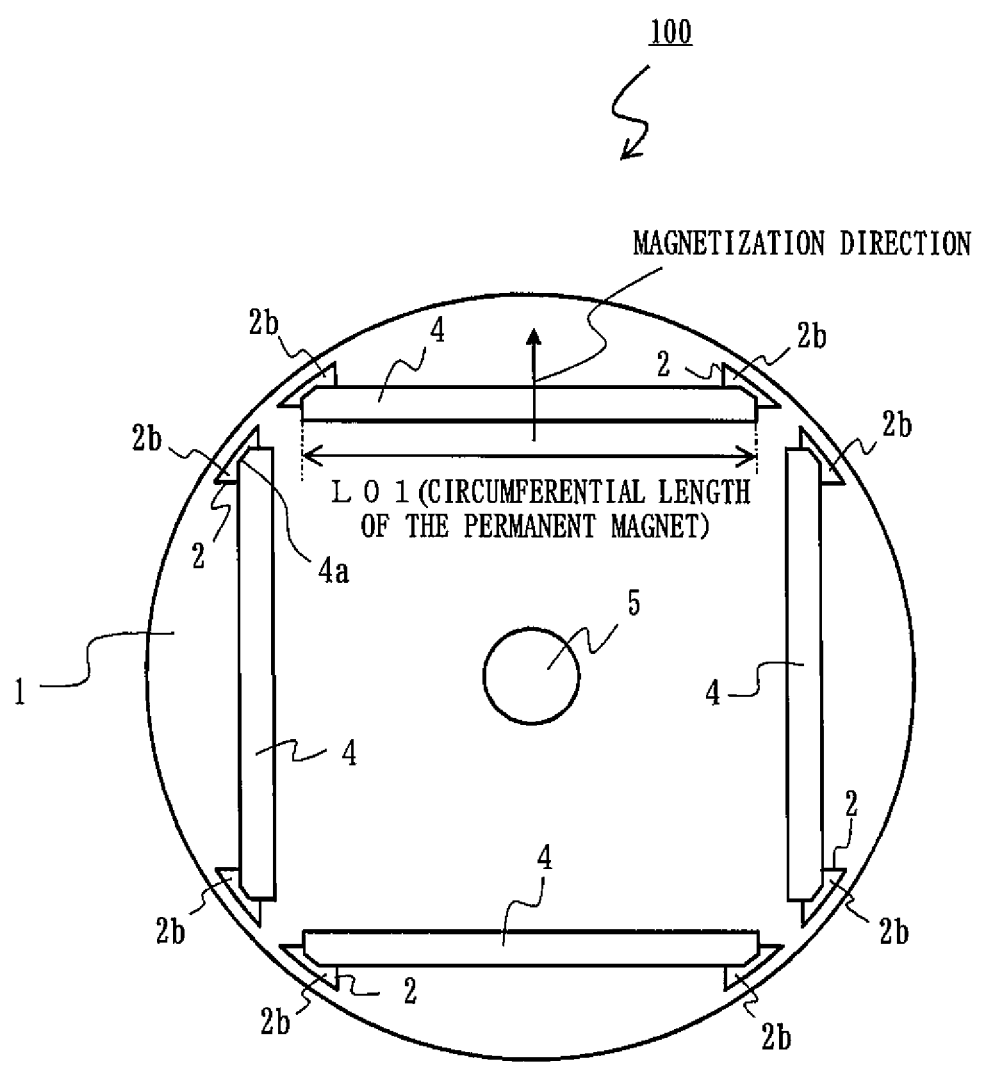
FIG. 5 A cross-sectional view of the rotor 100 of the interior permanent magnet motor in accordance with the first embodiment.
Figure 6:
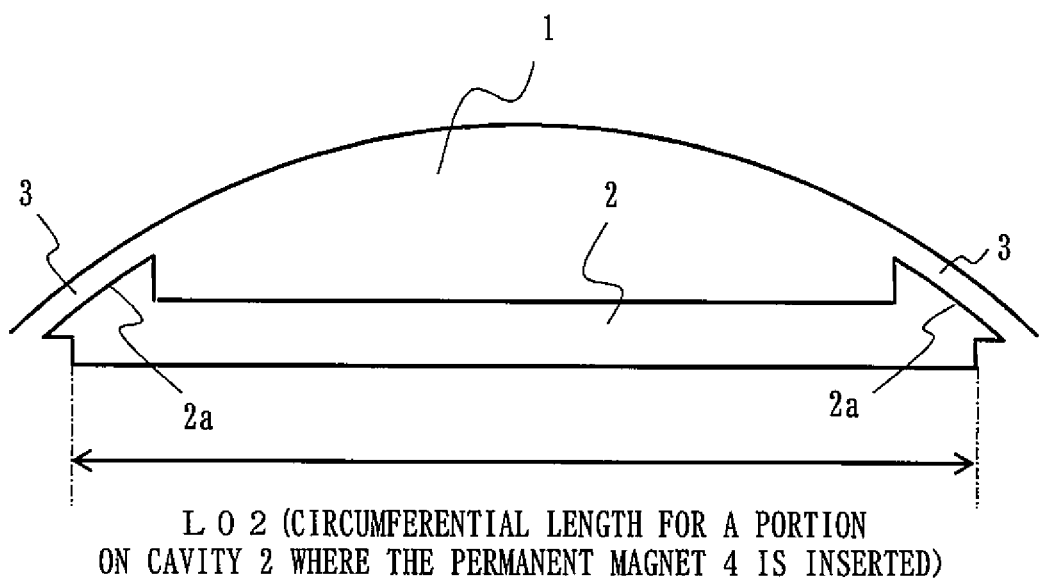
FIG. 6 A partial cross-sectional view of the rotor core 1 in accordance with the first embodiment.
Figure 7:
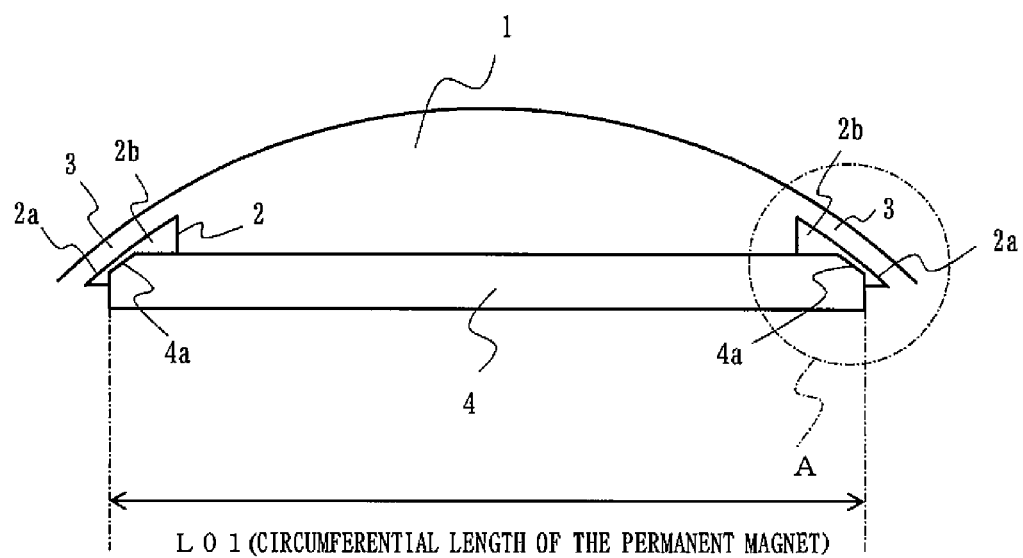
FIG. 7 A partial cross-sectional view of the rotor 100 in accordance with the first embodiment.
Figure 8:
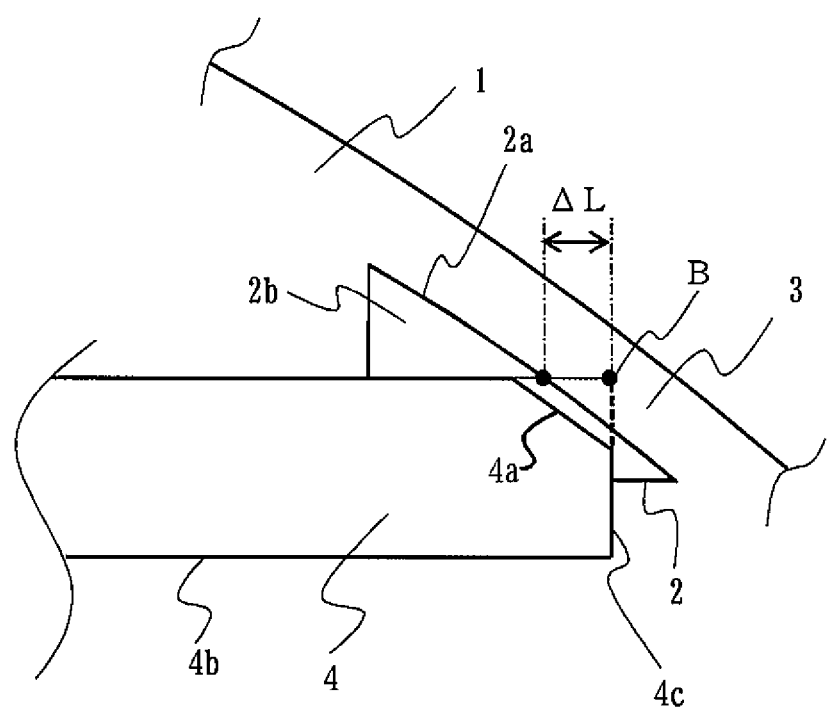
FIG. 8 An enlarged view of part A of FIG. 7 in accordance with the first embodiment.
Figure 9:
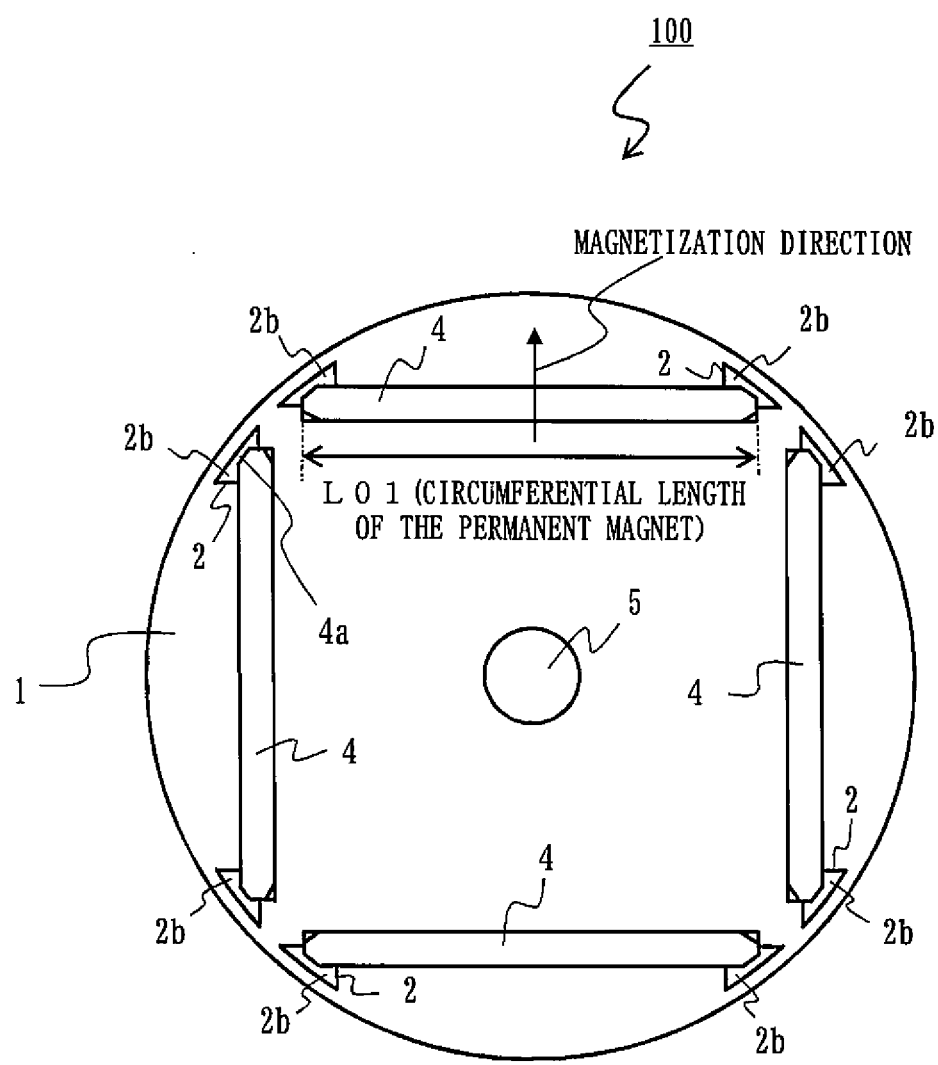
FIG. 9 A cross-sectional view of the rotor 100 of the modified example 1 in accordance with the first embodiment.
Figure 10:
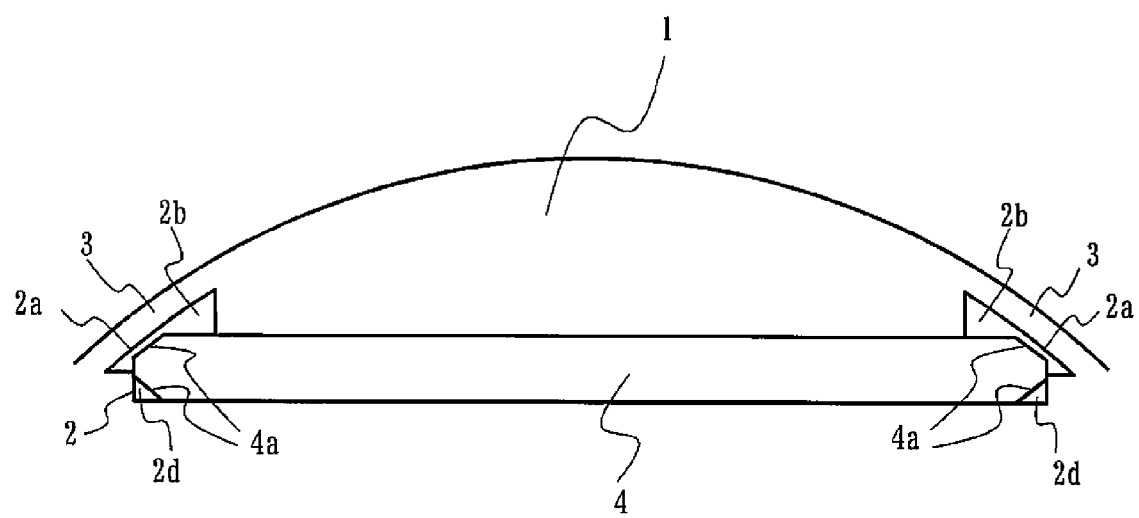
FIG. 10 A partial cross-sectional view of the rotor 100 of the modified example 1 in accordance with the first embodiment.
Figure 11:
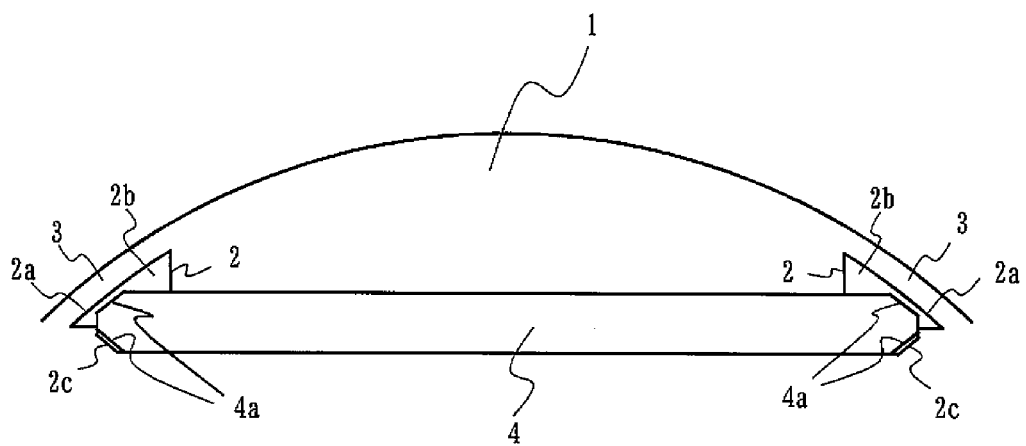
FIG. 11 A partial cross-sectional view of the rotor 100 of the modified example 2 in accordance with the first embodiment.
Figure 12:
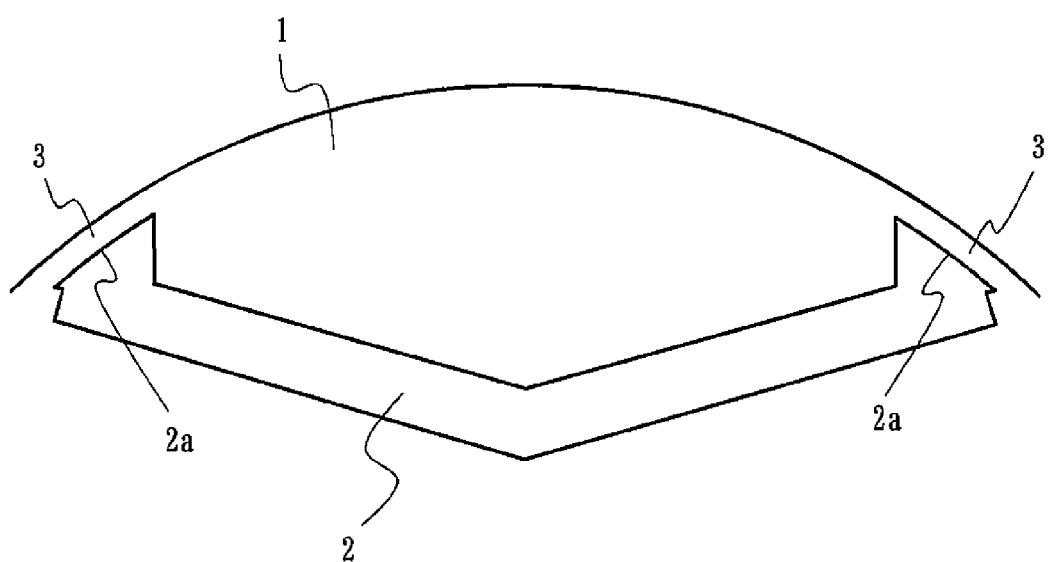
FIG. 12 A partial cross-sectional view of the rotor core 1 in accordance with the second embodiment.
Figure 13:
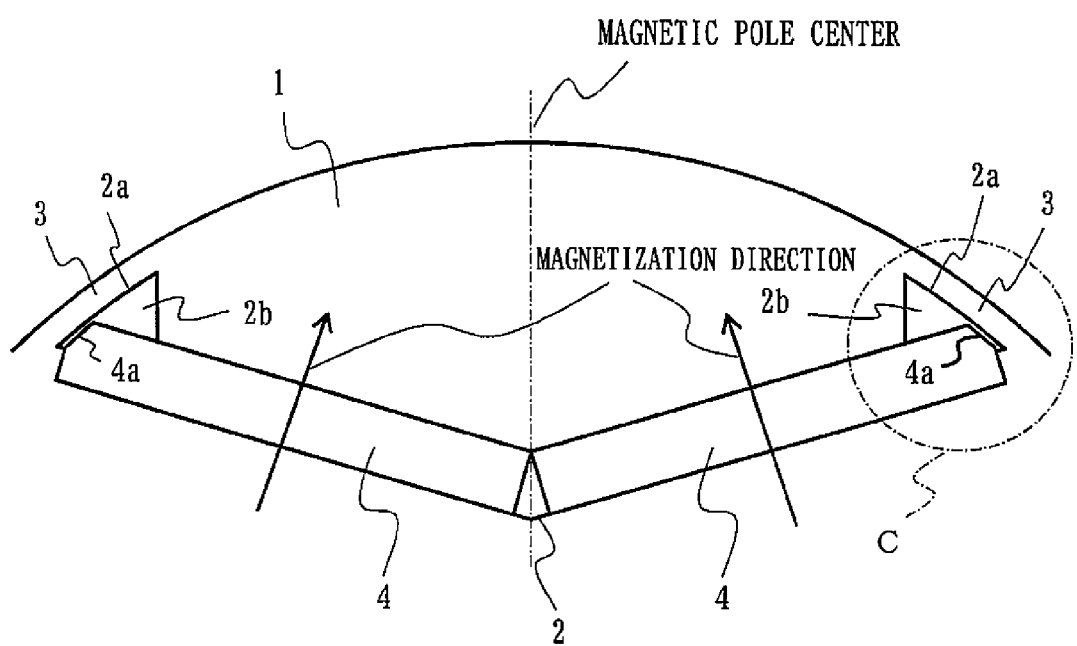
FIG. 13 A partial cross-sectional view of the rotor 100 in accordance with the second embodiment.
Figure 14:
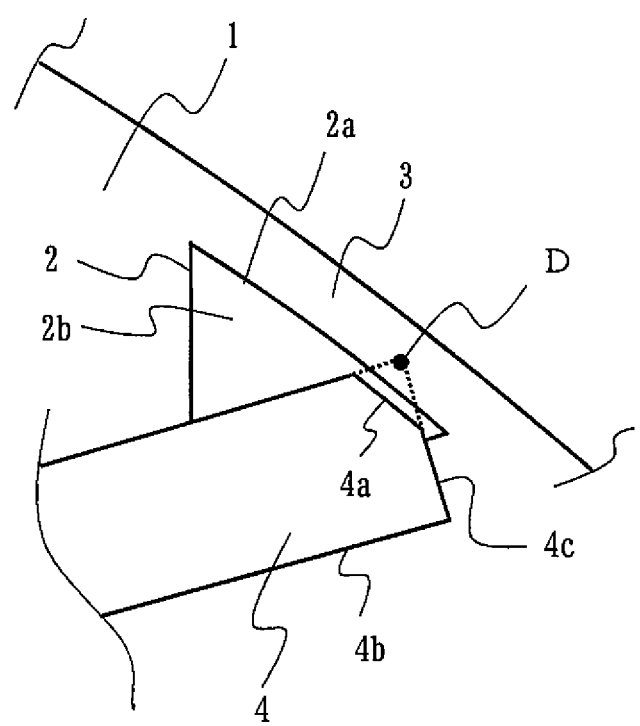
FIG. 14 An enlarged view of part D of FIG. 13 in accordance with the second embodiment.
Figure 15:
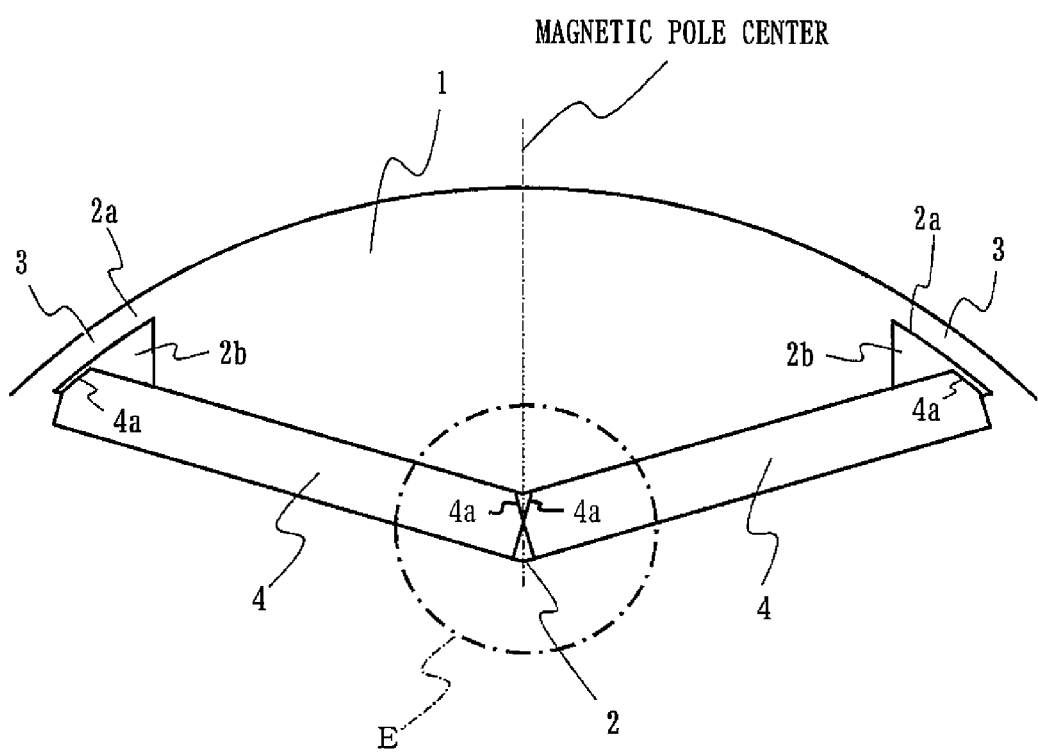
FIG. 15 A partial cross-sectional view of the rotor 100 of the modified example 1 in accordance with the second embodiment.
Figure 16:
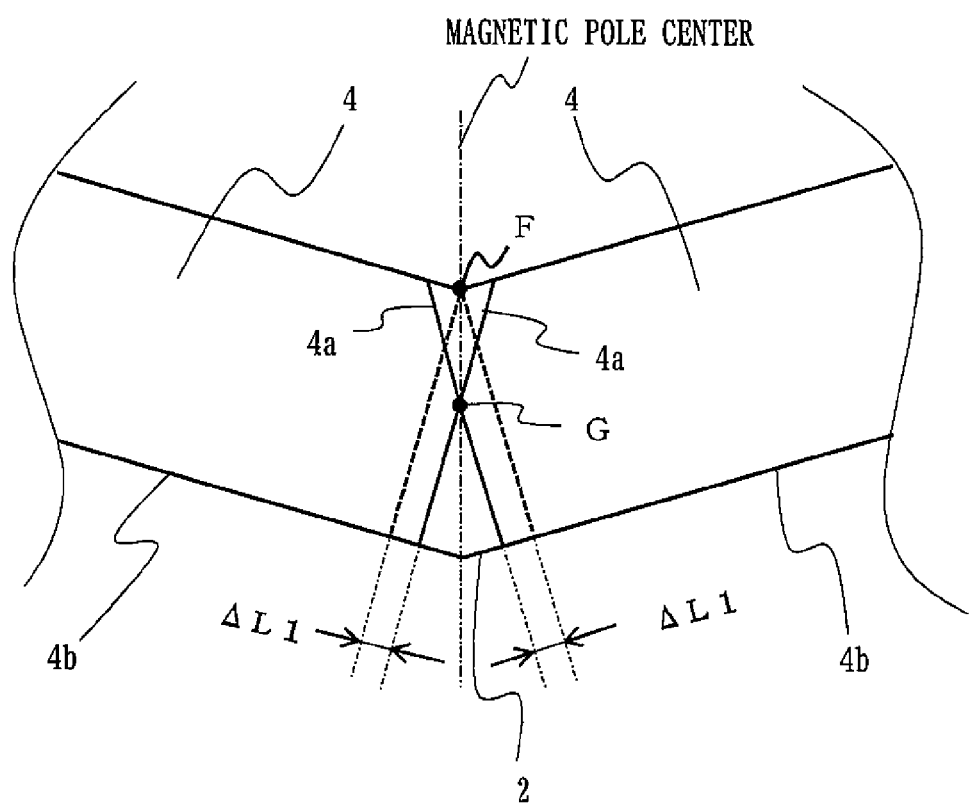
FIG. 16 An enlarged view of part E of FIG. 15 in accordance with the second embodiment.
Figure 17:
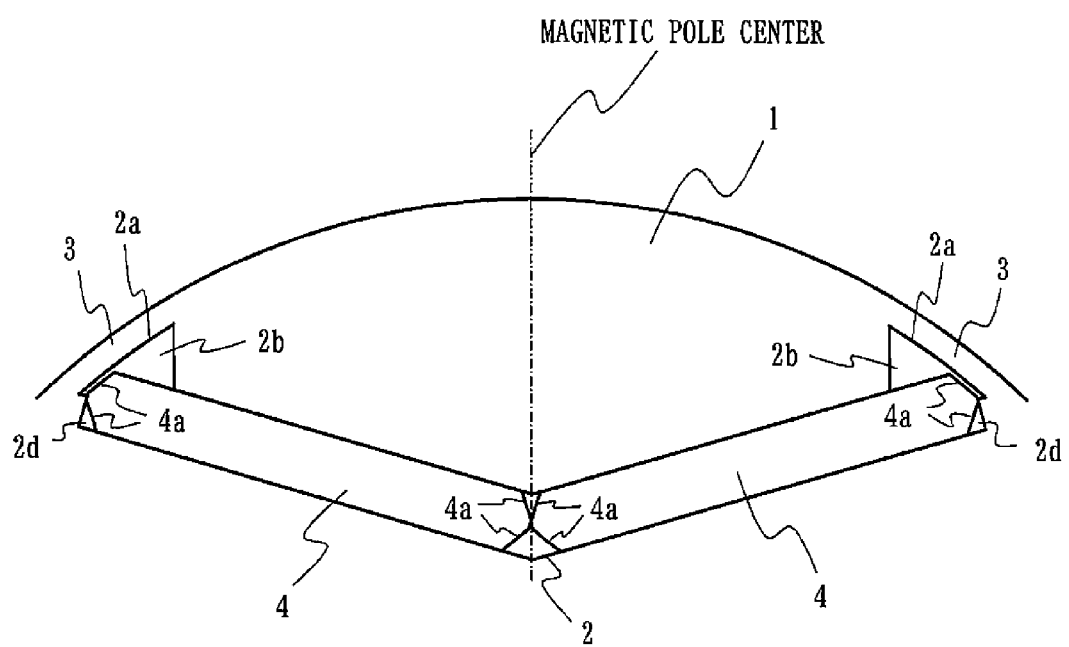
FIG. 17 A partial cross-sectional view of the rotor 100 of the modified example 2 in accordance with the second embodiment.
Figure 18:
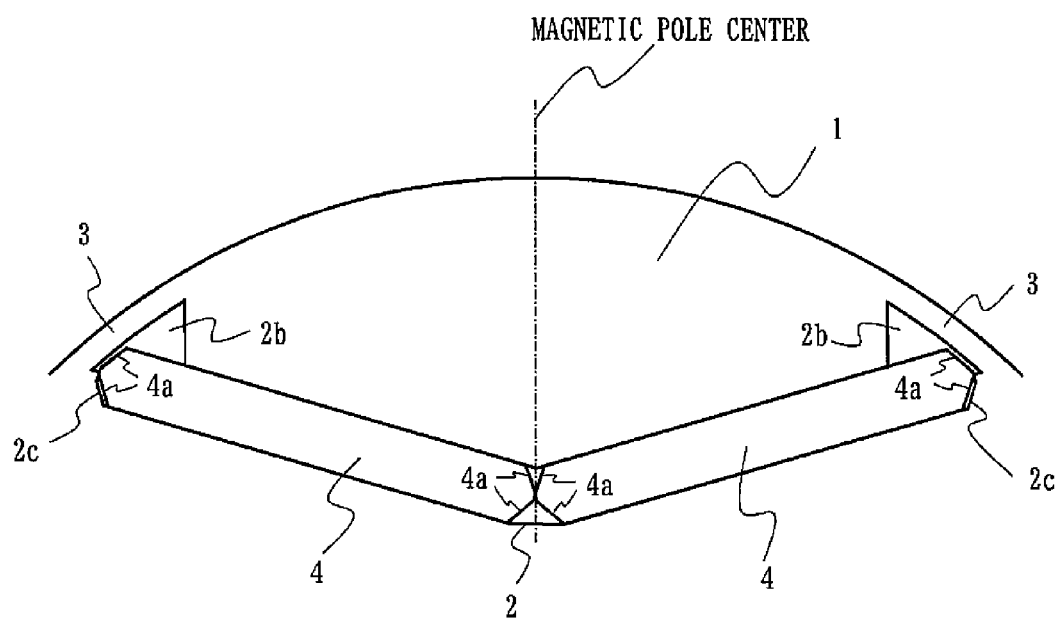
FIG. 18 A partial cross-sectional view of the rotor 100 of the modified example 3 in accordance with the second embodiment.
Figure 19:
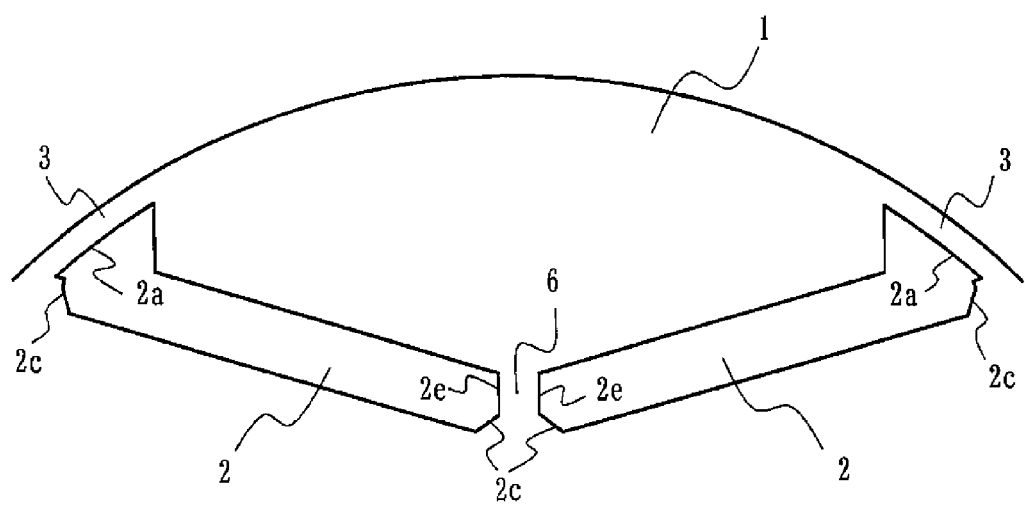
FIG. 19 A partial cross-sectional view of the rotor core 1 of the modified example 4 in accordance with the second embodiment.
Figure 20:
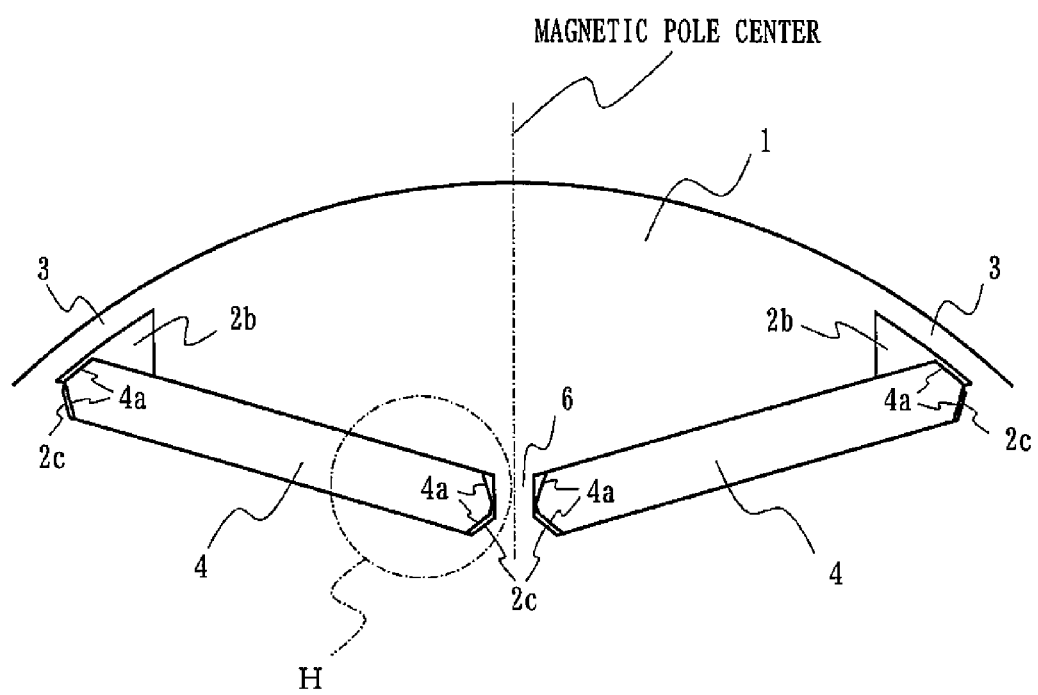
FIG. 20 A partial cross-sectional view of the rotor 100 of the modified example 4 in accordance with the second embodiment.
Figure 21:
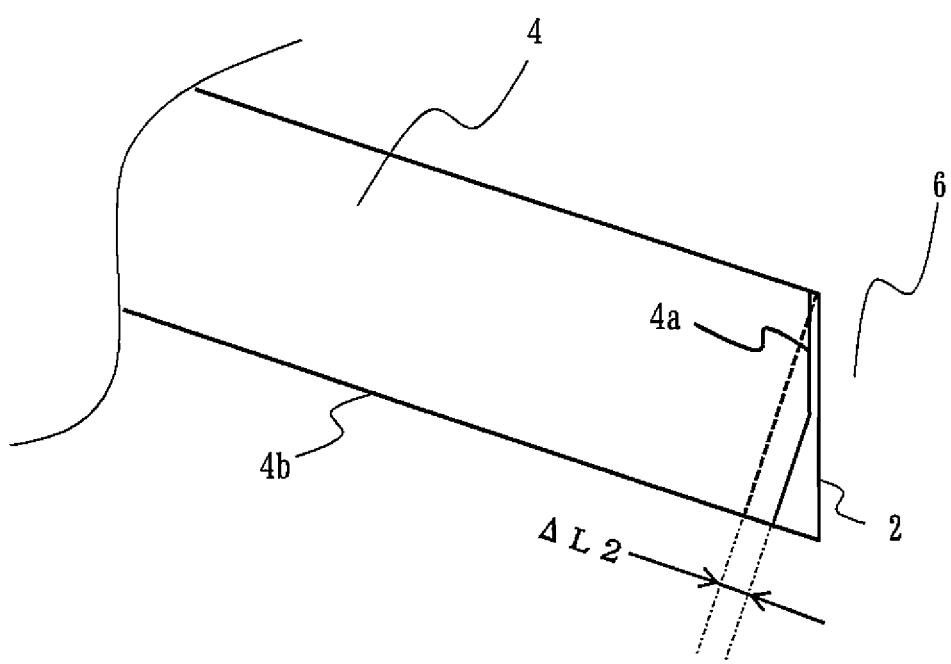
FIG. 21 An enlarged view of part H of FIG. 20 in accordance with the second embodiment.

Rotor core (1), cavity (2), endportion (2a), fluxbarrier (2b), chamfered portion (2c), flux barrier (2d), magnet pole center side end portion (2e), thin portion (3), permanent magnet (4), chamfered portion (4a), long side (4b), short side (4c), shaft hole (5), connection portion (6), rotor (100)

The invention claimed is:
1. A rotor for an electric motor, comprising:
a rotor core constructed by punching out silicon steel lamination plates into a predetermined shape and laminating a predetermined number of the silicon steel lamination plates; and
a plurality of sets of two flat-shaped permanent magnets, each set constituting a magnet pole, each of the two permanent magnets having a cross-sectional face with a shape of a rectangle having first and second chamfered corners on opposing ends of one long side of the rectangle,
wherein the rotor core is provided with a plurality of substantially V-shaped cavities each forming a convex shape along a magnet pole central line inwardly in a radial direction of the rotor core and extending to a vicinity of an outer peripheral portion of the rotor core on two sides of the magnet pole central line, and wherein the two permanent magnets of each set are inserted in a corresponding one of the cavities such that one of the two permanent magnets in each set is located on one side of the magnet pole central line of the corresponding one of the cavities, the other one of the two permanent magnets in each set is located on an opposite side of the magnet pole central line of the corresponding one of the cavities, the one long side of the cross-sectional face of each of the two permanent magnets is located more outwardly in the radial direction of the rotor core than the opposite long side of the rectangle, and end portions of the two permanent magnets closest to the magnet pole center line come into contact with each other on a point midway along the magnet pole central line of the corresponding one of the cavities.

2. The rotor for the electric motor according to claim 1, wherein the two permanent magnets of each set are inserted in the corresponding one of the cavities to form a flux barrier at each end portion of the corresponding one of the cavities in the vicinity of the outer peripheral portion of the rotor core.

3. The rotor for the electric motor according to claim 2, wherein the rotor core has a thin portion having a substantially constant dimension in the radial direction of the rotor core, between the outer peripheral portion of the rotor core and the flux barrier.

4. The rotor for the electric motor according to claim 3, wherein the two permanent magnets of each set are configured such that an intersecting point of an extended line of the one long side of the rectangle and an extended line of one short side of the rectangle of the cross-sectional face of each of the two permanent magnets is located on the thin portion of the rotor core or more outwardly in the radial direction of the rotor core than the thin portion, and one of the first and second chamfered corners corresponding to the intersecting point does not come into contact with the thin portion.

5. The rotor for the electric motor according to claim 2, wherein the rectangle also has a third chamfered corner on the opposite long side of the rectangle, wherein the two permanent magnets of each set are inserted in the corresponding one of the cavities such that an end portion of each of the two permanent magnets farthest from the magnet pole center line has two chamfered corners, and wherein a portion of each corresponding one of the cavities, other than the flux barrier at each end portion in the vicinity of the outer peripheral portion of the rotor core, facing two chamfered corners of each of the permanent magnets of each set, is made into a shape that fits to the chamfered portion.

6. The rotor for the electric motor according to claim 1, wherein the two permanent magnets of each set are made of rare earth magnets.

7. An electric motor comprising the rotor according to claim 1.

8. A ventilation fan comprising the electric motor according to claim 7.

9. A compressor comprising the electric motor according to claim 7.

10. The rotor for the electric motor according to claim 1, wherein four corners of the rectangle are all chamfered, and the cross-sectional face of each of the two permanent magnets of each set is horizontally and vertically symmetric.

* * * * *